J. C. MILLER.
FOOD PRODUCT OBTAINED FROM BREWERS' YEAST.
APPLICATION FILED MAR. 19, 1918.
1,391,562.
Patented Sept. 20, 1921.
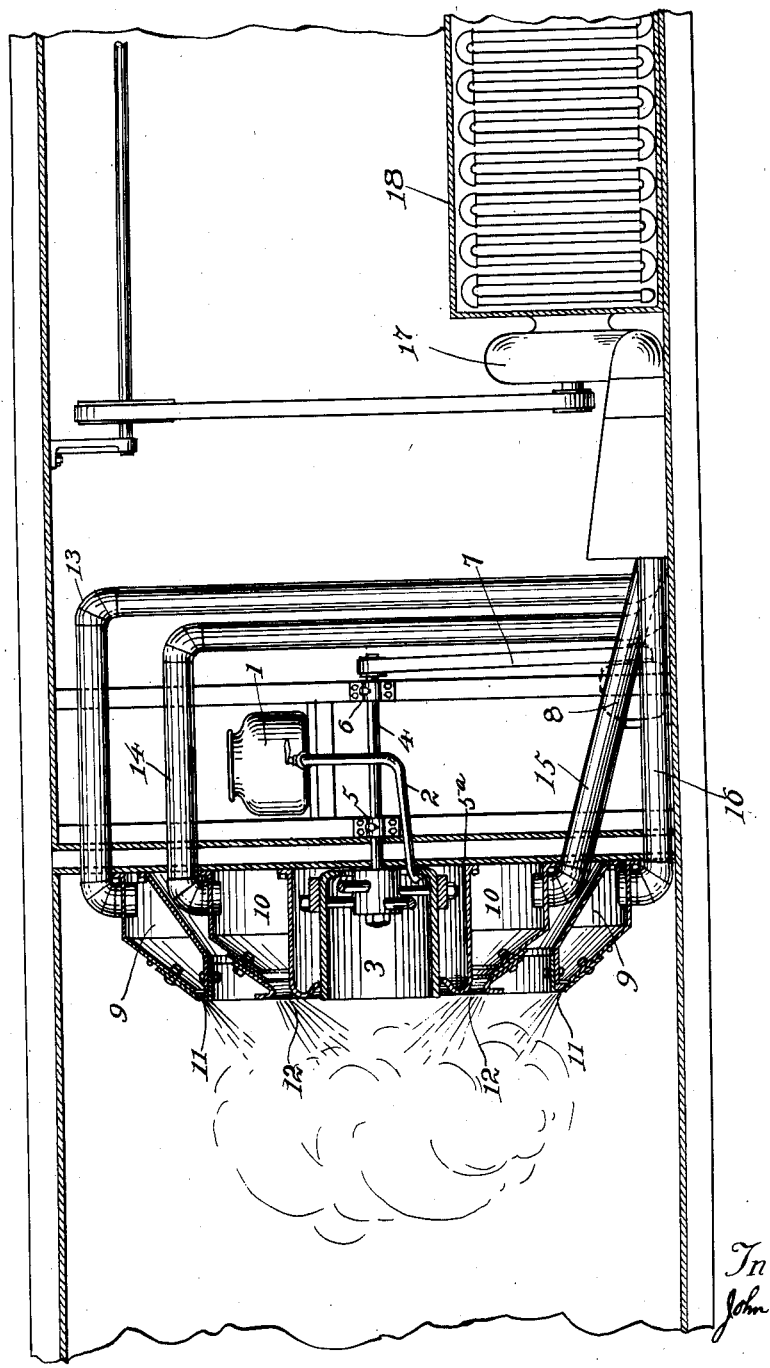
Inventor:
John C. Miller
By Allen & Allen
Attorneys.

UNITED STATES PATENT OFFICE.

JOHN C. MILLER, OF COVINGTON, KENTUCKY, ASSIGNOR TO THE EVAPORATING AND DRYING MACHINERY COMPANY, OF CINCINNATI, OHIO, A CORPORATION OF OHIO.

FOOD PRODUCT OBTAINED FROM BREWERS' YEAST.

1,391,562.     Specification of Letters Patent.     Patented Sept. 20, 1921.

Application filed March 19, 1918. Serial No. 223,261.

*To all whom it may concern:*

Be it known that I, JOHN C. MILLER, a citizen of the United States, and a resident of Covington, in the county of Kenton and State of Kentucky, have invented certain new and useful Improvements in Food Products Obtained from Brewers' Yeast, of which the following is a full, clear, and exact description, reference being had to the accompanying drawing, forming part of this specification.

Brewers' waste yeast when dried has for some years been utilized for a force feed for animals. When analyzed, the dried brewers' yeast contains on an average, about fifty-four percent. crude protein, twenty-five percent. nitrogen free extract, two per cent. crude fat and ten percent. ash and fiber.

The processes used heretofore in drying have, however, required a temperature of about 155° F., and with this temperature the active ferments present on the yeast cells are largely destroyed with a marked disintegration of the yeast cells themselves. It is the presence of the sound yeast cells with the active ferments that renders the product most suitable for a force feed for animals, and it is the special object of my invention to preserve the yeast cells in their original sound condition, and to furnish a new and valuable food product from brewers' yeast.

I also prepare the product in a very fine and floury condition which also renders it more suitable as a food product than dried brewers' yeast heretofore obtainable, which has usually been dried on steam heated rollers and scraped therefrom when dried by scraping knives which renders the material coarse and gritty.

In preparing my product, the wet material in the preferred apparatus is delivered into a rapidly rotating cylinder from which it is discharged by centrifugal force at the delivery end of the cylinder in the form of a very fine annular spray and is there subjected to a current of heated air, which is blown annularly across the centrifugally discharged material, so that the moisture is very rapidly taken up and the material can be readily collected in the form of a dry powder free from grit and in the condition of a flour.

Any suitable appartus may be employed for removing the moisture, but I have found the apparatus indicated in the accompanying drawing very well suited for the purpose.

In the drawing, the figure is a central vertical section of my drying apparatus.

The brewers' waste yeast is delivered from a suitable container 1 to pipe 2 into the inside of a cylinder 3 open at the delivery end, and this cylinder is mounted on a horizontal shaft 4, suitably journaled in supports 5 and 6. The cylinder is preferably mounted on the inside of the wall 5ª of the desiccating chamber, and it will be understood that a suitable chamber is provided which is closed on all sides for the reception of the dry material. The cylinder 3 is in the construction illustrated rotated at a very high rate of speed by the driving belt 7 through an electric motor 8. Surrounding the cylinder 3 and fixed to the wall of the desiccating chamber are preferably arranged a series of annular compartments 9 and 10, the discharge from which compartments comprises a narrow annular opening 11, 12, surrounding the cylinder. Into these compartments by a series of pipes 13, 14, 15 and 16, I discharge heated air from a blower indicated at 17, the air being passed over radiators or heaters 18, and the temperature of the air is maintained at about 110° to 120° F.

The cylinder 3 is rotated at a very high rate of speed, which causes the wet material delivered to the pipe 2 to be discharged as a cone-shaped spray, while the heated air is discharged substantially at right angles across this body of spray, so that the material is reduced to a dry powder.

By regulating the temperature of the air from 110° to 120° F., not only is a fine powder obtained, but the material upon a microscopic examination is found to be made up almost entirely of yeast cells, which are not destroyed or vacuolated. In fact, some samples of the powder are practically all yeast. The yeast cells are not disintegrated, and there is hardly any percentage of free peptones present.

The fact that the moisture is removed from the wet product practically instantaneously and that this is accomplished while in a heated atmosphere without contact with any heated metallic surface, prevents any baking of the product or disintegration of the cellular structure.

The fine powder is collected from the desiccating chamber and forms a most valuable and effective force feed for animals.

Having thus described my invention, what I claim as new and desire to secure by Letters Patent, is:—

1. A new food product consisting of brewers' yeast in the form of an impalpable powder, with the yeast cells in sound condition and the particles of powder not ground.

2. A new food product consisting of brewers' yeast in the form of an impalpable powder, with the yeast cells in sound condition and the particles of powder not ground, and the active ferments present as in the original wet material.

JOHN C. MILLER.